Dec. 9, 1969   K. FERTIG ETAL   3,483,457
ELECTRONICALLY COMMUTATED PERMANENT MAGNET TORQUE MOTOR
Filed June 21, 1967

INVENTORS:
KENNETH FERTIG
RODNEY EDWARDS, JR.

BY Joseph J. Alekshun Jr.
ATTORNEY

United States Patent Office 3,483,457
Patented Dec. 9, 1969

3,483,457
ELECTRONICALLY COMMUTATED PERMANENT MAGNET TORQUE MOTOR
Kenneth Fertig, Brookline, and Rodney Edwards, Jr., Framingham, Mass., assignors to Massachusetts Institute of Technology, Cambridge, Mass., a corporation of Massachusetts
Filed June 21, 1967, Ser. No. 647,858
Int. Cl. H02k 29/00
U.S. Cl. 318—138        11 Claims

ABSTRACT OF THE DISCLOSURE

An electronically commutated permanent magnet torque motor which has a resolver attached to the shaft of the motor for sensing the position of the rotor. The motor has M pole pairs and the resolver R pole pairs, where M is an integral multiple of R. The output of the resolver is combined with a DC control signal to drive the motor. The signal is also fed back and compared in phase with the resolver output to generate an error signal so that the stator field is always positioned for maximum torque.

BACKGROUND OF THE INVENTION

The invention herein described was made in the course of or under a contract or subcontract thereunder with the Department of Defense.

Field of invention

This invention relates generally to instrument grade motors and particularly to a brushless DC motor and a drive system therefor.

Description of the prior art

Because they feature comparatively high torquing efficiency and good control characteristics, DC motors are usually preferred over AC motors in instrumenting control systems. Most DC motors incorporate permanent stator magnets and generate torque through the interaction of the fields caused by the poles and those produced by the current in the rotor windings. A commutator acting in conjunction with brushes provides rotor current switching so as to produce a rotor field vector that is slightly misaligned with the field vector of the stator. This spatial misalignment between the two field vectors allows maximum torquing efficiency regardless of relative position between rotor and stator. It also permits the torque to be closely dependent on the armature current and leads to precise control over the torque generated.

The continuous contact between the brushes and commutators of DC motors, however, causes wear and the release of both graphite particles from the brushes and metal particles from the commutator. These conductive particles are carried to other parts of the motor, increase friction and sometimes produce short circuits in the slip ring assembly. Equally significant, the wear itself eventually results in sloppiness in the motor assembly and adversely affects overall performance and accuracy.

SUMMARY OF THE INVENTION

In view of the foregoing features of DC instrument grade motors and limitations thereof due to brush-to-commutator wear, applicant has as the primary object of his invention to provide a DC motor requiring no brushes or commutator.

It is another object of the invention to provide a motor that incorporates a control loop to maintain the misalignment between rotor and stator field vectors necessary for maximum torquing efficiency.

It is a further object of the invention to provide a drive system for the brushless motor.

It is a still further object of the invention to provide an electronic drive system that permits electronic control over the torque and speed characteristics of the motor.

Briefly, the invention in its broadest aspect includes a multi-phase motor which has a permanent magnet rotor. A resolver is provided whose rotor is physically attached to the shaft of the motor rotor for sensing the position of the motor shaft. The number of pole pairs in the motor is an integral multiple of the number of pole pairs in the resolver. Provision is made for transforming a sinusoidal output signal from the resolver, containing the motor-rotor position in phase information, into a variable phase square wave signal. The square wave signal controls a voltage controlled oscillator feedback loop which contains a voltage controlled oscillator which provides a frequency which is nominally the integral multiple times the resolver excitation frequency. A circuit which counts down the voltage controlled oscillator output by a factor of the integral multiple results in a square wave of approximately the same frequency as that applied to the resolver which is then compared in phase with the variable phase signal from the resolver. If the square waves do not have the proper phase relationship, an error signal is generated to alter the voltage control oscillator frequency until the proper phase relationship is obtained. In addition, the output of the voltage controlled oscillator is compared in phase with a pulse width modulated square wave control signal to generate signals which are appropriately phased to control the multiphase motor through switched power stages.

BRIEF DESCRIPTION OF THE DRAWING

Other objects and features of the invention will become apparent from the following more detailed description of the illustrative embodiment in reference to the accompanying drawing wherein.

DETAILED DESCRIPTION OF THE PREFERRED EMBODIMENT

Figure 1:
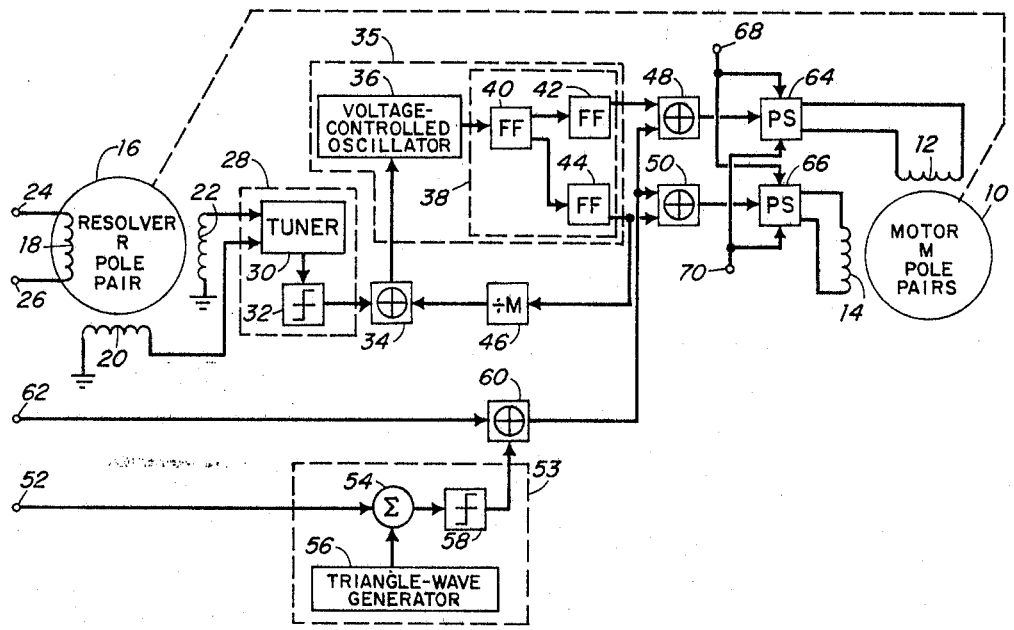
FIG. 1 is a block diagram of the basic torque motor and control system.

Referring to FIG. 1, there is shown a two phase synchronous motor 10 which has a permanent magnet field created by the permanent magnet rotor. The rotor has M pole pairs. Also shown are stator windings 12 and 14. Connected to the motor 10 on a common shaft is resolver 16 having R pole pairs. When excited by a sinusoidal input signal at frequency $\omega_0$ received on terminals 24 and 26 which are connected through slip rings to rotor coil 18 there are generated two amplitude modulated signals with the modulation varying as a cosine of $R\theta$ and sine of $R\theta$ on coils 22 and 20, where R is the number of resolver pole pairs and $\theta$ is the mechanical position of the rotor, thus providing an indication of the rotational location of the permanent magnet rotor of motor 10. The two sinusoidal outputs of windings 20 and 22 are fed to resolver tuning and digital conversion circuit 28 where the two sinusoidal outputs are then converted to a two-state signal (zero crossing detection) suitable for digital use. The output signal is now a variable phase square wave. The signal is fed to phase comparison circuit 34 where it is compared with a feedback signal to be discussed hereinafter. The output from the phase comparison circuit is used to control a voltage controlled oscillator 36 set to oscillate at approximately $M\omega_0/R$. The output from voltage controlled oscillator 36 is fed to a phase splitting network 38 where the output signal is divided into two signals in phase quadrature. One of these signals is fed back through countdown circuit 46 which reduces the frequency of the voltage controlled oscillator output signal to approximately the frequency of the resolver excitation signal. This signal is then used for phase comparison with the input signal from the resolver tuning network. When compared in phase with the signal from the resolver tuning network, an error signal is generated to control further the oscillation frequency of the voltage controlled oscillator.

The DC control signal is received at terminal 52 and converted into a pulse width modulated signal by conversion circuit 53. In this case, the DC control signal is added by summation circuit 54 to a triangle wave generated by a triangle wave generator 56, and acted upon by Schmitt trigger 58 used as a zero crossing detector to form a pulse width modulated signal where the pulse width modulation is a measure of the control required for the motor. This signal controls comparison network 60 which permits the reference signal from terminal 62, which is also at frequency $\omega_0$ and phase locked to the resolver excitation signal, to pass either in phase or out of phase depending on the state of the output of Schmitt trigger 58.

The pulse width modulated control signal from comparison network 60 is compared in phase with the pair of output signals from network 38 in phase comparators 48 and 50. The outputs of comparators 48 and 50 are pulse width modulated signals having a triangular distribution suitable for controlling power stages 64 and 66 which are connected to the stator windings 12 and 14, respectively, of motor 10. Connected to each of the power stages 64 and 66 are sources of suitable operating potential 68 and 70, which in this case are $+V$ and $-V$ respectively, but which could also be V and ground.

Although other methods have been previously used, for example, Hall effect devices, an electromagnetic resolver is currently favored for shaft position readout. This unit has a wound stator and a wound stator, one of which is excited with an AC carrier frequency. Two alternative methods can be used to derive an AC signal (at the carrier frequency for no rotation, otherwise at carrier frequency plus or minus rotor rotation frequency) of constant amplitude, but with phase shift (relative to the excitation) directly dependent on the rotor to stator position. An R speed (2R poles) resolver gives an electrical phase shift of R degrees for each degree of mechanical rotation. This signal may be used to start a counter which is then stopped by a fixed phase reference signal.

The first of these methods requires a stator with two windings orthogonal to each other and a rotor with a single winding. The two stator windings are then excited with otherwise identical signals in phase quadrature. The resulting waveform which is indicative of the rotor-stator angle is picked up on the rotor windings from which it is removed by means of slip rings for further use. This approach has the disadvantage that the required phase quadrature input signals are in practice difficult to attain accurately. Obviously, any degradation of excitation signal accuracy is certain to degrade system performance.

The second method and the one utilized in this embodiment has the resolver 16 and the motor 10 each having their rotors mounted on a common shaft and generally separated by a magnetic foil shield to avoid interaction of the respective magnetic fields. The stators are mounted in a housing and the shaft supported by ball bearings. Slip rings are used to bring the excitation signal to the resolver rotor winding 18. Coupling to the orthogonally placed secondary windings 20 and 22 will vary according to the rotor-stator position. Due to the initial known setting of the angular position of the motor rotor-stator angle relative to the resolver motor-stator angle, any information regarding a subsequent position of the resolver rotor also applies to the motor. When a sinusoidal excitation is applied to the resolver rotor 18, the output amplitudes of the secondary windings are sine and cosine functions of the rotor position.

Although the embodiment described includes slip rings and ball bearings, a rotary transformer used as the rotor of the resolver and fluid bearings would totally eliminate the need for any contact with the resolver-motor rotor assembly.

These signals are then combined in resolver tuning circuit 28, which consists of a tuning circuit 30 and a Schmitt trigger 32. The tuning circuit 30 combines the output signals from the resolver stator windings 20 and 22 to give a constant amplitude sinusoid with a phase relative to excitation on the rotor 18 controlled by the rotor-stator position. The output from the tuning circuit is applied to the Schmitt trigger 32 which being a bistable device serves to convert the input signal into a variable phase square wave.

This signal may also be utilized separately for direct readout of rotor-stator position and as a reference for sequencing other actions on a larger system of which this motor may be a part.

The excitation signals described above were sinusoidal; however, square wave input signals can also be utilized. The use of square waves with their high harmonic content tends to distort the output signals from the resolver; therefore degrading overall system accuracy. Also, an additional filter would be required to clean up the waveforms before further processing of the signal.

This signal is then applied to the voltage controlled oscillator loop which contains a voltage controlled oscillator nominally set to operate at a frequency which is partially constrained by the characteristics of the motor and resolver chosen. The frequency of operation is $$X \frac{M}{R} \omega_0$$

where as stated hereinbefore M is the number of pole pairs in the motor, R is the number of pole pairs in the resolver, and $\omega_0$ is the excitation frequency applied to the resolver. X is any integer, its magnitude being determined by the complexity of the succeeding section namely, the countdown circuit 38 wherein the frequency is reduced to $$\frac{M}{R} \omega_0$$

This frequency countdown is accomplished in this case by flip-flop circuits 40, 42 and 44. The output of the voltage controlled oscillator 36 is applied as the input to flip-flop 40. The output of the voltage controlled oscillator 36 may be unsymmetrical, flip-flop 40 is used to generate a symmetrical square wave since the flip-flop changes states only on the falling edge of the input signal from voltage controlled oscillator 36. Use of only the leading edge would provide equivalent performance. The 0 and 1 outputs are, therefore, 180 degrees out of phase, but when the frequency is again reduced by a factor of two by flip-flops 42 and 44, this constant time difference becomes a 90 degree phase shift. Additional flip-flops may be inserted between voltage controlled oscillator 36 and flip-flop 40, as required, such that the frequency reduction in phase splitter network 38 is X times, and the output frequency is $$\frac{M}{R} \omega_0$$

in this embodiment X equals 4. It is preferable for many obvious reasons, to restrict the chain to the minimum number of countdowns required.

The signal derived from counting down the output of the voltage controlled oscillator may be fed back to continuously update the performance of the voltage controlled oscillator. This is accomplished by picking off either signal from flip-flop 44 or flip-flop 42 and dividing the signal by M to reduce it nominally to the frequency of the output signal of the resolver-tuning network 28. This reduced frequency signal is fed to phase comparison circuit 34 along with the output from the Schmitt trigger 32. The phase comparison circuit in this case is an EXCLUSIVE OR logic element. [An EXCLUSIVE OR element is basically a difference amplifier followed by a driver wherein if the two inputs are nominally the same (both ones or zeros) the output signal is a one. If the two inputs are different (one is a zero and the other a one) the output is a zero.] Upon phase comparison of these signals, EXCLUSIVE OR 34 generates a signal to update the frequency of voltage controlled oscillator 36 to correspond to current motor rotation characteristics.

The DC control signal which might, for example, be a PIGA error signal, is presented at terminal 52. The DC control signal is converted to a phase modulated square wave signal by conversion unit 33. In this embodiment, this is accomplished by the DC control signal being summed in summation circuit 54 with the output of triangular wave generator 56 which operates at frequency $\omega_d$ which is several times greater or less than $\omega_0$, the resolver excitation frequency. The result is a phase modulated triangle wave with a DC lever proportional to the level of the DC control signal. This signal is then passed through Schmitt trigger 58 to provide a pulse width modulated square wave.

An externally generated reference signal of frequency $$\frac{M}{R}\omega_0$$

which is phase locked to the excitation signal to the resolver is presented at input terminal 62. This square wave reference signal is compared with the pulse width modulated control signal in comparator 60 which in this embodiment is again an EXCLUSIVE OR logic element identical to phase comparator 34. However, the function here is slightly different as explained hereinbefore due to the wide variation of frequencies of the input signals. Therefore, upon phase comparison of the phase modulated control signal and the phase locked reference signal, a pulse width modulated control signal of a nominal frequency equal to the output of the countdown circuit 38 is generated. This operation requires the two inputs to differ in frequency by factor several times larger than unity.

The pulse width modulated control signal from phase comparator 60 is applied to one terminal of each of phase comparators 48 and 50. The phase quadrature output signals containing information as to the motor rotor position are connected to the other inputs of phase comparators 48 and 50. Phase comparators 48 and 50 are again chosen to be EXCLUSIVE OR logic elements identical to EXCLUSIVE OR element 34. The outputs from these elements are a pair of pulse width modulated signals having triangular pulse width distributions in phase quadrature.

The triangularly distributed pulse width modulated motor control signals are applied to power switches 64 and 66. The outputs of power switches 64 and 66 are constrained to be either $+V$ which is introduced at terminal 68 or $-V$ at terminal 70. The two voltages are supplied to both power switches.

The switch used in this embodiment is a two state switch which reproduces the output waveforms of comparators 48 and 50 but at positive and negative voltage levels. The inductance of the motor windings 12 and 14 filters out the carrier frequency from the drive current so that the motor, which responds to current in the windings, is controlled by the triangular distributions. The inertia of the shaft also acts to reduce undesired rotational response at the carrier frequency.

The triangular distributions are used to excite the two phase motor in place of the more commonly used sinusoids or square waves. In this case, however, the phase (or frequency) of the triangular distributions is controlled by the position (or rotational rate) of the motor, so that maximum torque is developed at all times. Linear control is obtained by alternately reversing the direction of the motor, as determined by the duty cycle of the pulse width modulated control signal at the output of the conversion unit 53. The system is also compatible with a three state switch, but would require substitution of sawtooth generators for triangle wave generator 56, and additional elements to provide signals compatible with the operation of comparators 48 and 50, in this manner.

Figure 2:
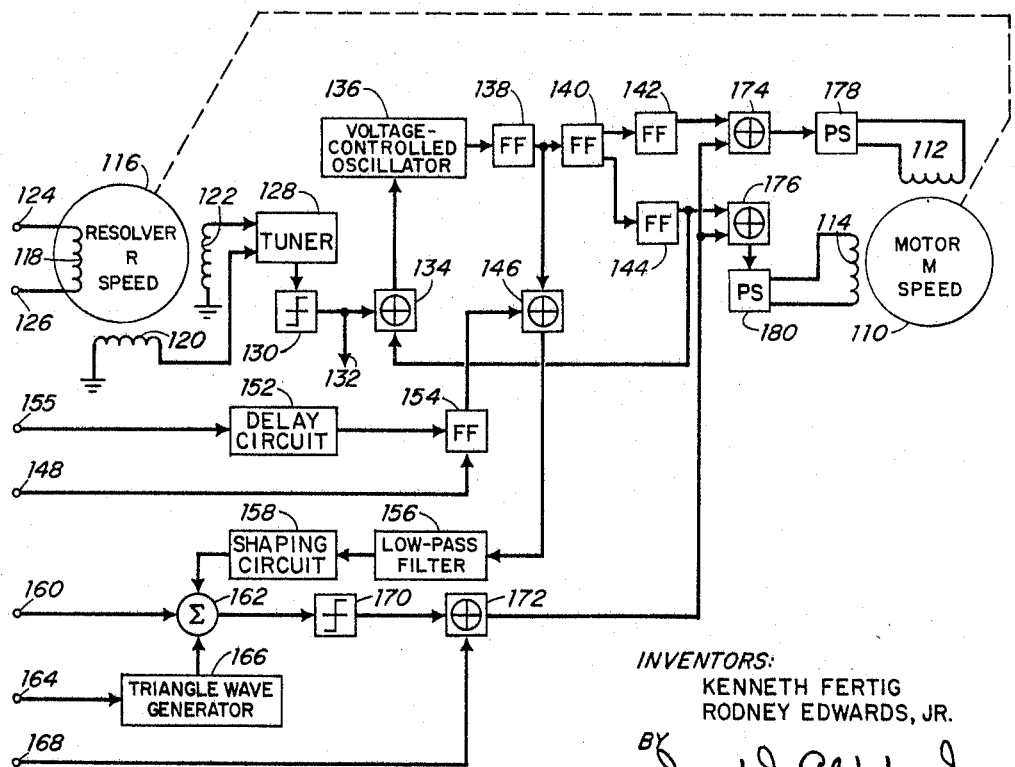
FIG. 2 is a block diagram of a preferred embodiment of the invention which incorporates in addition further means for reducing ripple torque.

Referring now to FIG. 2, there is shown a second embodiment of the invention. This embodiment is basically similar in operation to that shown in FIG. 1; however, there is included provision for compensating for some of the ripple torque generated by the use of the triangularly distributed waveform for exciting the motor, which was generally designed for excitation with sinusoids. The use of triangular waveforms causes a ripple torque which has a frequency four times that of the triangular waveform. This is because of the imperfect matching between the triangular wave and the sinusoid.

The components shown in FIG. 2 are basically similar to those of FIG. 1 except that an additional flip-flop 140 has been inserted serially between flip-flop 138 and flip-flops 142 and 144. Also a circuit to provide compensation for ripple torque generated by use of the triangular waveform is included and which comprises a delay circuit 152 connected serially between reference terminal 150 and one input of flip-flop 154. The second input of flip-flop 154 receives a second reference signal from terminal 150. A signal from the output of flip-flop 138 where the output of the voltage controlled oscillator has been shaped into a square wave is compared in phase with the reference signal from the output of flip-flop 154 in comparator 146. The output of the phase comparator 146 is passed serially through low pass filter 156 and shaping circuit 159 to summation circuit 162.

To provide compensation for this ripple torque, an additional correction signal is generated by taking the output of flip-flop 138, which is a square wave of variable phase and of a frequency four times that presented to the phase comparison circuits 174 and 176, and comparing it in phase with a reference signal in phase comparator 146. The reference signal is generated from a signal received at terminal 150 of frequency nominally twice that of the signal derived from flip-flop 138, which is applied to delay circuit 152 where the signal is delayed such that the correction signal to be generated will be 180 degrees out of phase with the ripple torque signal generated by the triangular waveform motor excitations. The delay to be introduced is adjustable to provide an optimum matching condition. The delayed signal is then applied to flip-flop 154 along with a signal from terminal 148 of one-half the frequency received at terminal 150. The flip-flop 154 provides an output square wave reference signal of the nominal frequency of that derived from flip-flop 138. The signal from terminal 148 assures that the output of flip-flop 154 will be properly phase related to the output of flip-flop 138, so that the otherwise arbitrary initial state of flip-flop 154 will not result in a sign reversal of the correction signal to be generated.

The reference square wave signal from flip-flop 154 and the signal derived from flip-flop 138 are phase compared by comparator 146, again an EXCLUSIVE OR logic element. The output of the EXCLUSIVE OR 146 is again a pulse width modulated signal with a triangular distribution; however, the triangular distribution is at a frequency four times that of the triangular waveform utilized as motor excitations. This signal is now passed through low pass filter 156 to remove the carrier and preserve the triangular waveform. Shaping circuit 158 further shapes the resulting pulse from the low pass filter 156 to provide a waveform best able to compensate for the ripple torque. The shaped correction signal is combined in summation circuit 162 with the DC control signal from terminal 160 and the fundamental triangular waveform from generator 162 to form the corrected control signal which is subsequently processed as described and shown in FIG. 1.

It should be mentioned that the above correction technique while described for compensating for ripple torque generated by use of the triangular waveform may be applied, in general, to many different causes of ripple torque generated in such a system. For example, the slot torque generated by the physical slots cut for the stator windings in the motor may be compensated by this technique. These are generally 2, 4, 8, etc. slots per pole pair on a motor; therefore, deriving a signal from the voltage controlled oscillator at the proper frequency and comparing it with a properly phased reference signal by means of an EXCLUSIVE OR gate, will generate a triangular distribution of the required number of cycles per motor revolution, which may be processed and summed into the control signal in summation circuit 162 as a correction signal. This technique may be repeated, as required, to simultaneously correct ripple errors at more than one frequency.

The embodiment shown in FIG. 2 has been built and operated using circuits which are suitable for or were available in integrated form, thus providing a compact package of high reliability.

While there has been shown and described what is considered to be the preferred embodiments of the present invention, it will be obvious to those skilled in the art that various changes and modifications may be made therein, for example, although the embodiment disclosed describes the use of DC control signals, AC signals may be used for control and sinusoids may be substituted for square waves, without departing from the invention as defined in the appended claims.

We claim:

1. A drive system for electronically commutating a P-phase motor having P stator windings and a permanent magnet rotor with M pole pairs mounted on a common shaft with the rotor of a resolver having R pole pairs, where M is an integral multiple of R, which continuously senses the rotor to stator angular position of the motor by producing a sinusoidal output when excited by a signal having a frequency of $\omega_0$, the drive system for which comprises:

means for transforming the sinusoidal output signal from the resolver into a variable phase square wave signal, the phase being a function of the rotor to stator angular position;

a voltage controlled oscillator network having an input terminal and P output terminals providing P square wave output signals of nominal frequency $$\frac{M}{R} \omega_0$$

separated in phase by $180/P$ degrees;

a countdown circuit which counts down in frequency its input signal by a factor of M having an input terminal connected to one of the output terminals of the voltage controlled oscillator network;

a first phase comparator having first and second input terminals and an output terminal, the first input terminal being connected to the output of the countdown circuit, the second input being connected to the output of the transforming means, and the output being connected to the input terminal of the voltage controlled oscillator network whereby an error signal is generated in the phase comparator to control the frequency and phase of the P output signals;

a source of DC control signals;

means for providing a pulse width modulated control signal with a level proportional to the level of the DC control signal;

a source of a square wave reference signal of frequency $$\frac{M}{R} \omega_0$$

phase locked to the resolver excitation signal;

means for comparing the phase locked reference signal and the pulse width modulated reference signal to provide a pulse width modulated reference signal of a nominal frequency of $$\frac{M}{R} \omega_0$$

a group of P phase comparators each having first and second input terminals and an output terminal, the first input of each phase comparator being connected to a different one of the P output terminals of the voltage controlled oscillator network and the second input terminal of each phase comparator being connected in common to the output of the comparison means thereby generating P phase coordinated control signals; and a group of P power stages being connected between the output terminals of the group of P phase comparators and the motor stator windings to control the operation of the motor.

2. A drive system according to claim 1 in which said motor is a two phase synchronous motor.

3. A drive system according to claim 2 in which said voltage controlled oscillator network comprises:

a voltage controlled oscillator having an input terminal and an output terminal, the input terminal being connected to the output terminal of said first phase comparator providing a signal of nominal frequency $$X \frac{M}{R} \omega_0$$

at the output terminal, where X is a power of 2; and a phase splitter network having an input terminal and first and second output terminals, the input terminal being connected to the output terminal of the voltage controlled oscillator, the output signals being in phase quadrature at nominal frequency $$\frac{M}{R} \omega_0$$

and in which said means for providing a pulse width modulated control signal comprises:

a triangle wave generator having a frequency of $\omega_d$ and an output terminal;

a summation circuit having first and second input terminals and an output terminal, the first input terminal being connected to said source of DC control signals and the second input terminal being connected to the output terminal of the triangle wave generator, thereby providing a triangular wave output signal having a level proportional to the DC input signal; and means for generating a pulse width modulated square wave signal from the triangular wave signal from the summation circuit.

4. A drive system according to claim 3 in which said phase splitter network comprises:

a first flip-flop circuit having an input terminal and first and second output terminals, the input terminal being connected to the output of said voltage controlled oscillator, the circuit is synchronized to change states with one of the edges of the output signal from the voltage controlled oscillator thereby producing a 2:1 reduction in frequency and a 180 degree phase shift between the signals at the first and second output terminals; and second and third flip-flop circuits each having an input terminal and an output terminal, the input terminals being separately connected to the output terminals of the first flip-flop circuit, the circuits are synchronized to change states on the same edge as in the first flip-flop thereby reducing the frequency by 2:1 and reducing the phase separation to 90 degrees; and in which said phase comparators are EXCLUSIVE OR gates.

5. The drive system according to claim 1 in which said voltage controlled oscillator network further includes a third output terminal having a signal present thereon which is at a frequency which is an integral multiple of said first and second output signals of said voltage controlled oscillator network, the multiple being the number of the harmonic of the motor excitation frequency at which a ripple torque component exists; and which further includes a ripple torque correction circuit which comprises:

a source of reference signals at the nominal frequency of the voltage controlled oscillator third output signal; and a phase comparator having first and second input terminals and an output terminal, the first input terminal being coupled to the source of reference signals, the second input terminal being coupled to the third output terminal of the voltage controlled oscillator network, and the output terminal being coupled to said second input terminals of said group of P phase comparators, thereby generating a correction signal for eliminating the undesired ripple torque component.

6. An electronically commutated permanent magnet torque motor which comprises:

a P-phase motor having P stator windings and a permanent magnet rotor having M pole pairs;

a resolver having a stator and a rotor, the rotor having R pole pairs and being physically coupled to the rotor of the motor, where M is an integral multiple of R, and which produces an output signal which is a function of the motor rotor to stator angle;

means for transforming the sinusoidal output signal from the resolver into a variable phase square wave signal, the phase being a function of the rotor to stator angular position;

a voltage controlled oscillator network having an input terminal and P output terminals providing P square wave output signals of nominal frequency $$\frac{M}{R}\omega_0$$

separated in phase by 180/P degrees;

a countdown circuit which counts down in frequency its input signal by a factor of M having an input terminal connected to one of the output terminals of the voltage controlled oscillator network;

a first phase comparator having first and second input terminals and an output terminal, the first input terminal being connected to the output of the countdown circuit, the second input being connected to the output of the transforming means, and the output being connected to the input terminal of the voltage controlled oscillator network whereby an error signal is generated in the phase comparator to control the frequency and phase of the P output signals;

a source of DC control signals;

means for providing a pulse width modulated control signal with a level proportional to the level of the DC control signal;

a source of a square wave reference signal of frequency $$\frac{M}{R}\omega_0$$

phase locked to the resolver excitation signal;

means for comparing the phase locked reference signal and the pulse width modulated reference signal to provide a pulse width modulated reference signal of a nominal frequency of $$\frac{M}{R}\omega_0$$

a group of P phase comparators each having first and second input terminals and an output terminal, the first input of each phase comparator being connected to a different one of the P output terminals of the voltage controlled oscillator network and the second input terminal of each phase comparator being connected in common to the output of the comparison means thereby generating P phase coordinated control signals; and a group of P power stages being connected between the output terminals of the group of P phase comparators and the motor stator windings to control the operation of the motor.

7. An electronically commutated permanent magnet torque motor according to claim 6 in which said motor is a two phase synchronous motor.

8. An electronically commutated permanent magnet torque motor according to claim 7 in which said voltage controlled oscillator network comprises:

a voltage controlled oscillator having an input terminal and an output terminal, the input terminal being connected to the output terminal of said first phase comparator providing a signal of nominal frequency $$X\frac{M}{R}\omega_0$$

at the output terminal, where X is a power of 2; and a phase splitted network having an input terminal and first and second output terminals, the input terminal being connected to the output terminal of the voltage controlled oscillator, the output signals being in phase quadrature at nominal frequency $$\frac{M}{R}\omega_0$$

and in which said means for providing a pulse width modulated control signal comprises:

a triangle wave generator having a frequency of $\omega_d$ and an output terminal;

a summation circuit having first and second input terminals and an output terminal, the first input terminal being connected to said source of DC control signals and the second input terminal being connected to the output terminal of the triangle wave generator, thereby providing a triangular wave output signal having a level proportional to the DC input signal; and means for generating a pulse width modulated square wave signal from the triangular wave signal from the summation circuit.

9. An electronically commutated permanent magnet torque motor according to claim 8 in which said phase splitter network comprises:

a first flip-flop circuit having an input terminal and first and second output terminals, the input terminal being connected to the output of said voltage controlled oscillator, the circuit is synchronized to change states with one of the edges of the output signal from the voltage controlled oscillator thereby producing a 2:1 reduction in frequency and a 180 degree phase shift between the signals at the first and second output terminals; and second and third flip-flop circuits each having an input terminal and an output terminal, the input terminals being separately connected to the output terminals of the first flip-flop circuit, the circuits are synchronized to change states on the same edge as in the first flip-flop thereby reducing the frequency by 2:1 and reducing the phase separation to 90 degrees; and in which said phase comparators are EXCLUSIVE OR gates.

10. An electronically commutated permanent magnet torque motor according to claim 6 in which said voltage controlled oscillator network further includes a third output terminal having a signal present thereon which is at a frequency which is an integral multiple of said first and second output signals of said voltage controlled oscillator network, the multiple being the number of the harmonic of the motor excitation frequency at which a ripple torque component exists; and which further includes a ripple torque correction circuit which comprises:
a source of reference signals at the nominal frequency of the voltage controlled oscillator third output signal; and
a phase comparator having first and second input terminals and an output terminal, the first input terminal being coupled to the source of reference signals, the second input terminal being coupled to the third output terminal of the voltage controlled oscillator network, and the output terminal being coupled to said second input terminals of said group of P phase comparators, thereby generating a correction signal for eliminating the undesired ripple torque component.

11. A drive system for electronically commutating a P-phase motor having P sequentially numbered stator windings and a permanent magnet rotor having M pole pairs physically coupled to the rotor of a resolver having R pole pairs which produces, in response to an excitation signal of frequency $\omega_0$, an output signal whose phase is a function of the motor rotor to stator angular position, the drive system comprising:

a voltage controlled oscillator network having an input terminal and P sequentially numbered output terminals, the network providing P output signals of nominal frequency $$\frac{M}{R}\omega_0$$

phase shifted relative to each other at the output terminals by $180/P$ degrees;
means for dividing the frequency of one of the output signals from the voltage controlled oscillator network by M;
means for comparing the phase of the output signal from the resolver with that of the signal from the dividing means, generating and applying an error signal to the input terminal of the voltage controlled oscillator network to control the frequency and phase of the voltage controlled oscillator network output signals;
a source of input control signals;
means operative in response to the input control signal for providing a pulse width modulated control signal having a voltage level proportional to the voltage level of the input control signal; and
a group of P sequentially numbered phase comparator circuits, each having two input terminals and an output terminal, the first input terminal of each circuit being coupled to the correspondingly numbered output terminal of the voltage controlled oscillator network, the second input terminal of each circuit being coupled to the pulse width modulated control signal, and the output terminals of the circuits being coupled to the correspondingly numbered stator windings of the motor, the circuits compare the phase of the two input signals and generate drive signals to drive the motor at the desired speed, in the desired direction, and at a position of maximum torque.

References Cited

UNITED STATES PATENTS 3,353,076  11/1967  Haines _____ 318—254

G. R. SIMMONS, Primary Examiner

U.S. Cl. X.R.

318—254